United States Patent Office 2,716,406
Patented Aug. 30, 1955

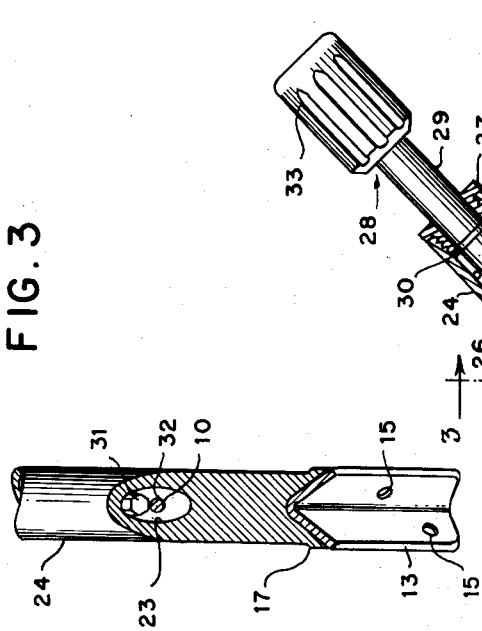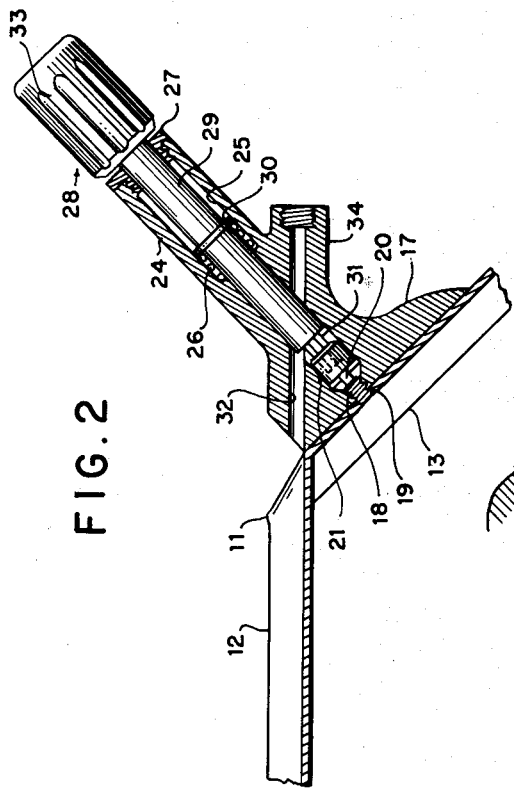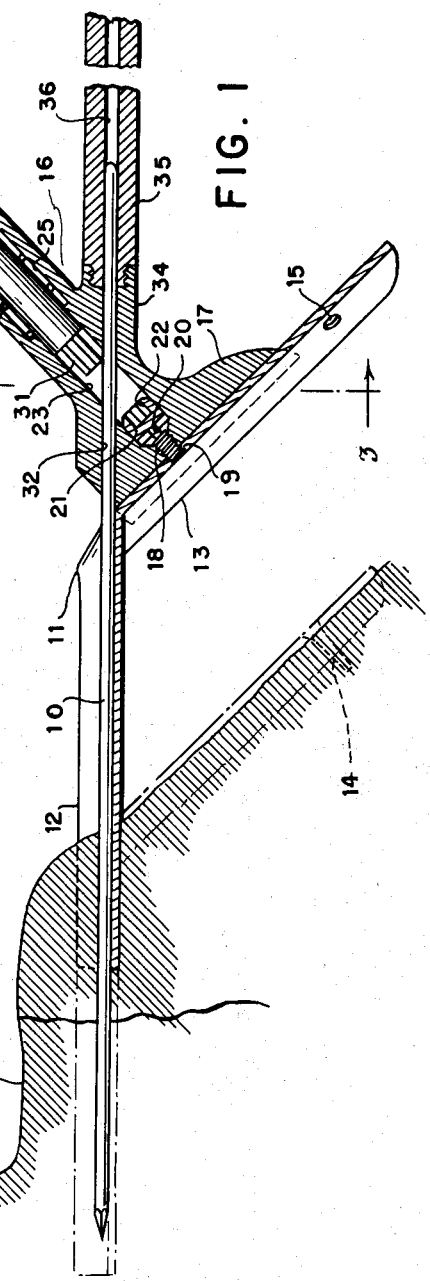
Edward H. Reymann
Guido J. Borella
INVENTORS.

2,716,406

HIP-NAIL DRIVER FOR ANGULAR HIP NAILS

Edward H. Reymann, Bronxville, and Guido J. Borella, Flushing, N. Y., assignors to Austenal Laboratories, Incorporated, New York, N. Y., a corporation of New York Application September 16, 1953, Serial No. 380,435

6 Claims. (Cl. 128—83)

This invention relates generally to surgical instruments and has reference specifically to certain improvements in the construction of hip-nail drivers used particularly in bone surgery, and more specifically in hip-joint fractures and other bone conditions requiring the use of an angular hip nail.

It is well known practice when fractured hip joints are of a serious nature, to employ a straight or angular metal pin or nail to permanently fix the broken sections or ends together. This is accomplished at the operation where a straight nail is indicated by first inserting a guide rod into the fractured joint along a desired line where the hip nail is to be permanently seated, and having properly located the guide rod in place, the hip nail is arranged against the rod and guidedly driven into the bone. However, where an angular hip nail must be used instead of the straight type, no guide rod can be used. This is due to the fact that a hip-nail driver must be attached to one arm of the angular nail in order to provide means whereby the other arm or actual nail portion may be driven into the bone, and in the driving position of the nail the guide rod projecting along the line of the nail portion of the hip nail interferes with the driver and must be eliminated in the operation with the loss of its obvious advantages.

With the foregoing clearly in mind, it is the purpose of the present invention to provide an angular hip nail with a driver which is attachably connected to the angular hip nail and is of a novel construction, whereby a guide rod of the type heretofore used with straight hip nails may be used just as efficiently as a guide for the angular hip nail without giving any interference to the hip-nail driver in its operation of inserting the nail, or in the removal of the guide rod independently of the driver and the nail, when the latter is completely inserted in the bone structure.

The purpose of the invention is accomplished by means of certain combinations and arrangements of parts hereinafter described in the specification, set forth in the appended claims and illustratively exemplified in the accompanying drawings, in which:

Figure 1 is a substantially longitudinal sectional view of a fractured bone structure with guide rod inserted, an angular hip nail partially inserted along the guide rod, and a hip-nail driver, according to the present invention, attachably connected to a portion of the nail and in driving position therefor;

Figure 2 is a similar view of the nail and driver in the position of being attachably connected together;

Figure 3 is a substantially transverse sectional view of the hip nail, guide rod and driver taken on lines 3—3 of Fig. 1.

Referring to the drawings, 10 denotes a guide rod which has been properly located and driven into the fractured portion of a hip joint A. The rod 10 is a long needle-shaped metal device which is pointed at its leading end and projects outwardly from the point of introduction in the bone structure to receive and guide a hip nail 11. The hip nail 11 consists of a metal channel strip of V-shaped transverse section, which is bent longitudinally into a substantially obtuse angle, one arm 12 being the actual nail portion and being adapted to be driven into the bone structure while the other arm 13, having the V-shaped reversed downwardly is adapted to rest against and be attached to the surface of the bone radially of the point of entry of the nail arm 12 therein, as shown in dotted lines in Fig. 1. When the hip nail 11 is driven fully into the bone, the arm 12 is fully embedded and the arm 13 is contacting the surface of the bone A, the arm 13 being permanently attached to the latter by means of screws 14 projecting through openings 15 in the arm 13.

The nail arm 12 of the hip nail is located on the guide rod 10 and slidably held in place thereon by means of a driver 16, which comprises a shoe portion 17, channeled longitudinally of its under side to embrace the arm 13 adjacent its upper part. The shoe 17 is attachably connected to the arm 13 by means of a screw 18 which engages the threaded opening 19 in the arm 13, and which is provided with a reduced shaft 20 terminating in an enlarged head 21 having a poly-sided broached socket 22 open at its outer end. The head 21 is cylindrical and operates longitudinally in a cylindrical bore 23 projecting outwardly at right angles to the shoe 17 and line of arm 13 and into a cylindrical projection 24 integral with the body of the nail driver 16. At the upper or outer portion, the bore 23 is enlarged to provide a chamber 25 for a helical spring 26, the outer end of the chamber being closed by a screw cap 27. The cap 27 has a longitudinal bore of the diameter of the bore 23 to accommodate a screw driver 28, consisting of a cylindrical body shank 29 projecting into the bore 23 at one end and outwardly through the cap 27 at the other end. Approximately midway of the length of the shank 29 the latter is provided with a flange 30 of the diameter of the chamber 25 against which flange one end of the helical spring 26 bears to yieldably project the screw driver 28 outwardly while the opposite end of the spring seats against the inner end wall of the chamber 25. The inner end of the screw driver 28 is provided with a polysided projection 31 to fit into the broached socket 22 in the head 21 when the driver is depressed against the spring and towards the shoe 17. Running through the body of the shoe 17 at an angle approximately midway between the line of contact with the nail and the bore 23 is a second bore 32 which is a continuation of the line along which the guide rod projects outwardly from the bone, and coincident with the bottom of the channel of the arm 12 of the nail 11. The bores 23 and 32 intersect each other, whereby the screw 18 is on one side of the intersection and the screw driver is on the other side, so that the guide rod 10 may traverse the bore 32 without interference from the screw driver 28. The outer end of the screw driver 28 is provided with an enlarged grip 33 for easy manipulation. The shoe 17 of the driver 16 is further provided with an integral boss 34 coalined with the bore 32 and interiorly threaded at its free end to receive a hammer rod 35 in the form of a cylindrical bar having a bore 36 coextensive with bore 32 to receive the outer projecting end of the guide rod 10.

In operation, it has been explained that the first step in an operation of this nature is to properly locate the guide rod 10 in the fractured bone A and to drive same into the latter to the necessary depth, leaving the trailing end projecting outwardly from the bone. The shoe 17 of the hip-nail driver 16 is made ready by being attached to the arm 13 of the angular nail 11. This is accomplished by placing the shoe 17 onto the arm 13 at a position where the screw 18 is aligned with the threaded opening 19. The screw driver 28 is then depressed against spring 26 until the shank 31 enters the socket 22 of screw 18, By turning the screw driver 28 the screw 18 is screwed into arm 13 until the head 21 is against the bottom of bore 23 and the shoe 17 is firmly fixed to the arm 13. The screw driver 28 is then released and is raised by spring 26 to a point where the shank 31 is above and clear of the path between the ends of the bore 32 where the latter intersects the bore 23. This arrangement allows the hip-nail driver to be disposed over the projecting portion of the guide rod 10 by entering the latter into the forward end of bore 32 of the shoe 17 to a position approximately that illustrated in Fig. 1 of the drawings. The hammer rod 35 is then attached and the hip nail driver is ready to insert the hip nail 11 into the bone structure in a manner well known, i. e., by tapping on the hammer rod 35 and driving the nail 12 along the guide rod 10 until it is fully projected into the bone, and the arm 13 is in contact with the bone surface. Screws 14 are inserted to permanently fix the hip nail in place on the bone. The guide rod 10 is then withdrawn outwardly through the bore 32 and the screw driver 28 depressed to again insert the shank 31 into socket 22 of the screw 18. Rotation of the driver releases the screw 18 from the arm 13 and the entire hip-nail driver may be removed, leaving the hip nail in its permanent place in the bone.

Having described our invention and the manner in which the same is operated, what we claim and desire to secure by Letters Patent is:

What is claimed is:

1. In an attachment for a hip-nail driver, the combination of a shoe for attachment to an arm of an angular hip nail, said shoe having a bore to receive a guide rod projecting from the bone of a patient and coaligned with the nail arm of the hip nail, said shoe having a second bore intersecting the first bore at an angle thereto, means disposed in the second bore on one side of the intersection with the first bore and engageable with the first-mentioned arm of the hip nail to attach the latter removably to the shoe, and operating means arranged in the second bore on the opposite side of said intersection to traverse the intersection and engage the first means to effect a connection and/or disconnection of the shoe with respect to the hip nail.

2. An attachment for a hip-nail driver, as claimed in claim 1, in which said first means comprises a screw having a threaded tip and a head portion shaped for engagement with a screw driver, and in which said operating means comprises a screw driver provided with an end portion adapted to move into and out of engagement with said head portion to turn the screw and to release itself therefrom, said first mentioned hip nail arm having a threaded aperture formed therein to receive said tip of said screw.

3. An attachment for a hip-nail driver, as claimed in claim 2, in which the screw driver comprises a cylindrical shaft having a collar substantially intermediate its length, and a spring arranged in the second bore to engage the collar and yieldably support the end portion of the driver out of the path traversed by the said guide rod through said first bore, substantially as described.

4. An attachment for a hip-nail driver, as claimed in claim 3, in which the said second bore is enlarged in diameter at its outer end portion to accommodate the spring and collar, and a screw cap for the end of the second bore through which the screw driver moves axially and about its axis to engage and turn the screw.

5. An attachment for a hip-nail driver, as claimed in claim 2, including spring means disposed in the second bore and yieldably urging the screw driver out of the path traversed by the guide rod.

6. An attachment according to claim 2, wherein said head portion of said screw is provided with a non-circular socket for receiving said end portion of said screw driver, and in which said end portion of said screw driver has a tip non-circularly shaped for engagement with said socket.

References Cited in the file of this patent

UNITED STATES PATENTS 2,602,445   Gallant et al. _____ July 8, 1952
2,645,220   Gallant et al. _____ July 14, 1953

OTHER REFERENCES

The Journal of Bone & Joint Surgery for October 1944, pg. 707.

The Journal of Bone & Joint Surgery for July 1948, vol. 30A, pg. 787. (Copies in Scientific Library.)